Jan. 15, 1963   E. R. SANDHAGE ET AL   3,073,087
METHOD OF SEALING HARD SHELL CAPSULES
Filed Jan. 25, 1962   2 Sheets-Sheet 1
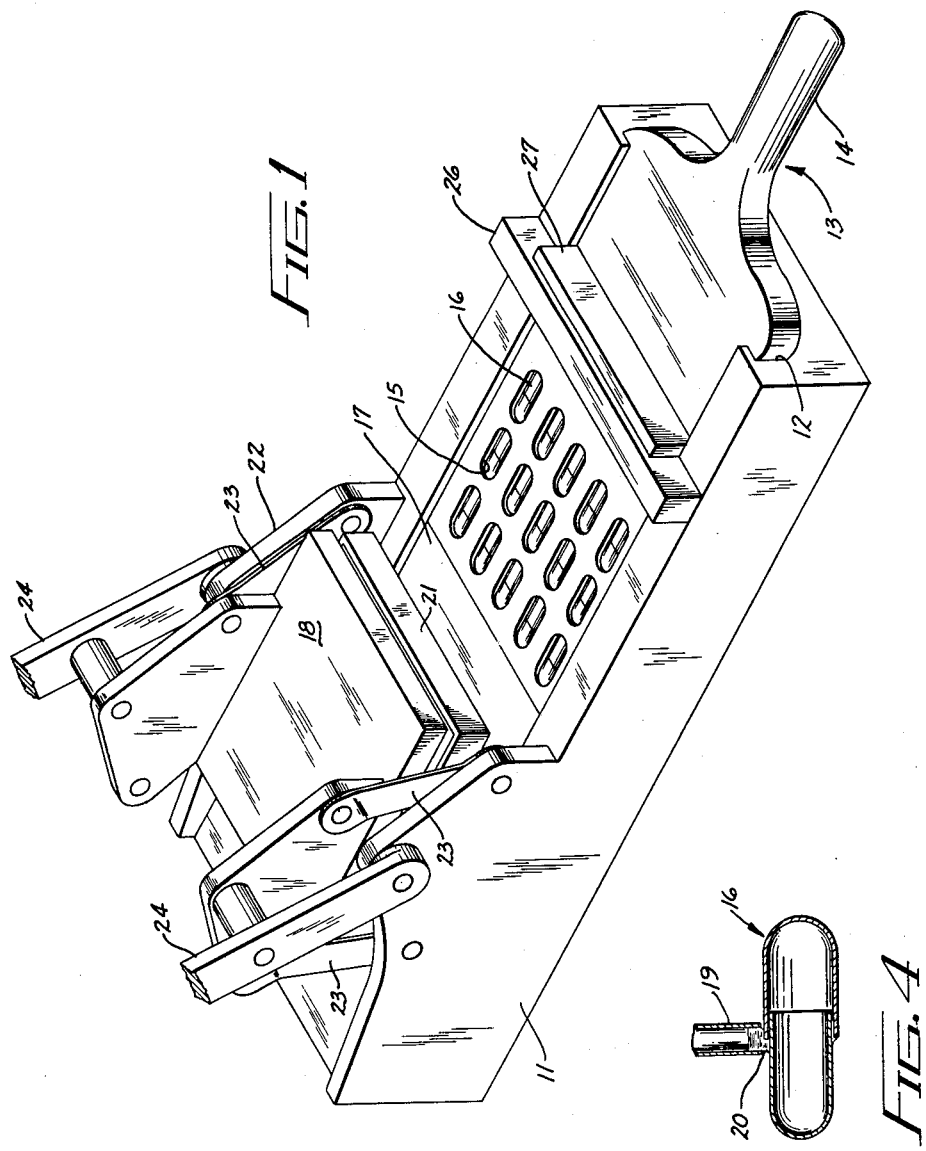
INVENTORS
*ELLSWORTH ROLAND SANDHAGE
WILLIAM HENRY MARLOW*
BY
Samuel Branch Walker
ATTORNEY

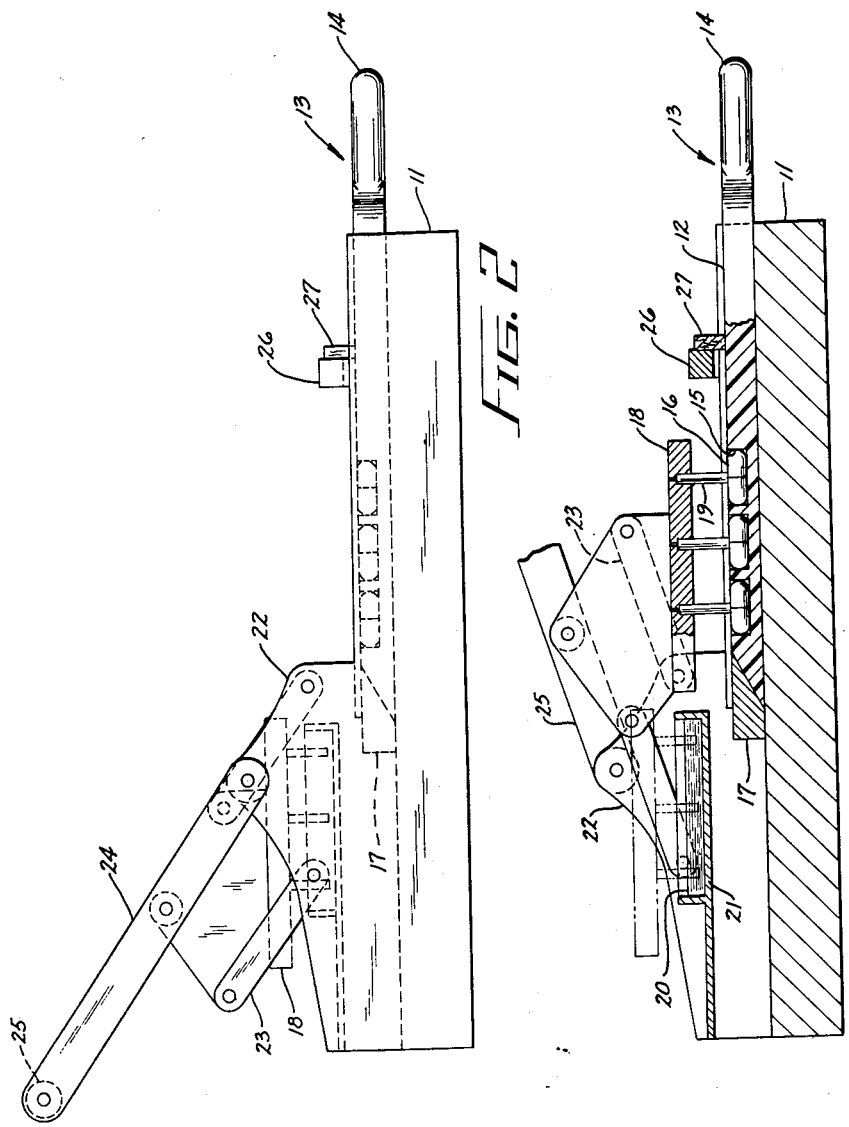

3,073,087
METHOD OF SEALING HARD SHELL CAPSULES
Ellsworth Roland Sandhage and William Henry Marlow, Pearl River, N.Y., assignors to American Cyanamid Company, New York, N.Y., a corporation of Maine
Filed Jan. 25, 1962, Ser. No. 168,786
2 Claims. (Cl. 53—38)

This invention relates to a method for sealing hard shell capsules by introducing a small quantity of a solvent at the seal line between the inner body and the outer cap, and permitting the liquid to be drawn by capillarity between the two, which sufficiently softens each that the two parts seal to each other, and simultaneously counting the capsules This application is a continuation-in-part of our co-pending application Serial Number 48,519, filed August 9, 1960, "Sealing Hard Shell Capsules," now United States Patent Number 3,025,652, dated March 20, 1962.

Many pharmaceutical products are dispensed in hard shell capsules which consist of an inner body and an outer cap, each of substantially pure gelatin, telescoped together. Powder is placed in the inner body, and the outer cap telescopes over the filled inner body. Capsules which are so filled at times fall apart in shipment because the two parts do not fit tightly together. Efforts have been made to seal the two parts together by placing a band of gelatin around the juncture. Such methods usually require a comparatively complex chucking procedure. Those used for forming stripes on capsules may be used.

Other methods have included dipping the entire capsule in a solvent system which would soften the two parts enough to cause them to stick together, but yet which would not soften the capsules to such an extent that they would stick to each other or become so soft as to be distorted. Such concepts require an extra step. Each additional step in processing adds to labor costs.

It has now been found that the capsules can be sealed together as part of a single coordinate operation that counts, inspects and seals. Capsules are frequently counted by a paddle procedure in which cavities are formed in a paddle of a size to just contain one capsule. The number of cavities corresponds to the number of capsules to be packed in a single package, or a submultiple thereof. Preferable, each paddle is of a transparent material, such as polystyrene or polymethylstyrene. The paddle is plunged into a bulk quantity of the capsules and lifted out through the capsules with a slight shake. Normally, one capsule is then found in each cavity. By visual inspection, the paddle is checked to be sure that there are no empty cavities or, if there is an empty cavity, that the cavity is filled, and simultaneously the capsules are inspected for quality.

In the conventional procedure, the paddle is then inverted over a funnel through which the capsules fall into the final package.

In accordance with the present invention, while oriented in the paddle, a drop of sealant liquid is brought into contact with the two-piece capsule at the line of junction between the inner body and the outer cap. By capillarity, the liquid is drawn between the inner body and the outer cap, softens each of them, and causes them to adhere to each other so that the capsule is tamper-proof and will not rupture under any reasonable handling. Usually, the capsule shell ruptures before the inner body and the outer cap can be separated. The tightness of the seal insures the integrity of the capsule and prevents unscrupulous persons from tampering with the contents.

For the sealant liquid, a mixture of a water-soluble, aliphatic, monohydric alcohol and water is effective. The lower alcohols of from 1 to 3 carbon atoms, are preferred, including methyl alcohol, ethyl alcohol, propyl alcohol, or isopropyl alcohol, or their mixtures. The alcohol reduces the surface tension, and is a solvent. A small quantity of a wetting agent aids in expediting the penetration of the solvent between the inner body and the outer cap. Wetting agents, such as sodium di-(2-ethyl-hexyl)sulfosuccinate, are particularly useful because they are known to be non-toxic as well as having the desired surface-active action. Other conventional non-reactive wetting agents which are free from deleterious effect when taken internally may be used. A group of suitable wetting agents appears in "Synthetic Detergents," volume 3, 1955, John W. McCutchen, Inc., 475 Fifth Avenue, New York 17, New York. A list of commercially available surface-active agents and detergents appears in Chemical and Engineering News, for June 27, 1960, at pages 69 to 77, a price list, with trade names and chemical names. For capsules to be taken internally, only the non-toxic ones should be used. The polyoxyethylene derivatives of fatty acid esters, such as polyoxyethylene sorbitan mono-oleate; or polyoxyethylene stearate, or polyoxyethylene-polyoxypropylene copolymers, etc., are useful agents. Other non-toxic agents include other alkyl sodium sulfosuccinates, such as the comercial available di-iso-octyl sodium sulfosuccinate, di-n-octyl sodium sulfosccinate, di-hexyl sodium sulfosuccinate, the polyoxyethylene oxide alkylates, the polyoxyethylene alkylols, polyoxyethylene alkamides and alkyl-phenoxyethyl-polyglycol condensates. Many of the other surface-active agents in the above references are also non-toxic, although non-toxicity has not been the subject of rigorous proof.

The wetting agent should be soluble in the sealant liquid. About 1% of the wetting agent gives a very rapid action. Less agent, down to 0.02% or less, improves the wetting action of the solvent system.

Even though not all of the solvent evaporates from the capsule after the sealing action, a delay for drying is often unnecessary as the quantity of liquid is so small as to have no deleterious action in many final packages. A hot air blast over the capsules dries them more quickly. For those pharmaceutical products which require dryness for storage, the packages containing the counted capsules may be left open until the contents are dry and then closed; hot air speeds the drying.

Other modifications within the scope of the appended claims may be used for practicing of the present invention. One machine for practicing the invention is shown in the accompanying drawings in which:

FIGURE 1 is a pictorial of the sealing machine with a paddle filled with causules shown in location, and the liquid transfer tubes in the sealing liquid trough.

FIGURE 2 is a side view of the completed machine.

FIGURE 3 is a section through the machine showing the liquid transfer tubes in contact with the seal line of the capsules.

FIGURE 4 is an enlarged view of a two-piece, hard shell capsule, showing the action of capillarity in drawing the sealing liquid between the inner body and the outer cap.

A frame 11 has a paddle receiving groove 12 therein to receive and position a capsule paddle 13. The capsule paddle has a paddle handle 14. At the other end are a plurality of cavities 15. The cavities are each just big enough to receive a capsule 16. A different paddle is used for different sizes of capsules. A paddle stop 17 positions the paddle properly when the paddle is pushed into the paddle receiving grooves 12.

Reciprocally mounted upon the frame is a transfer head 18. The transfer head supports a plurality of liquid transfer tubes 19. These conveniently are of small tubing, such as hypodermic tubing, in which the sealing liquid 20 is drawn by capillarity. Small pieces of felt may be used also.

Above and behind the paddle position is a sealing liquid trough 21. On the frame sides 22 are carrier arms 23 which support the transfer head 18. A four-armed parallelogram is used in which the frame sides and the transfer head form two sides of a parallelogram and two carrier arms form the other two sides of the parallelogram, on each side of the frame. The transfer head moves in an arc from its position with the liquid transfer tubes dipped in the sealing liquid trough to a position in which the liquid transfer tubes are in juxtaposition to the seal line between the inner body and the outer cap of the capsules in the capsule paddle.

To reciprocate the transfer head between its two positions, an operating handle 24 is mounted with one end pivoted on the frame sides 22 and a center position pivoted on the transfer head 18 with the gripping member 25 of the handle above the frame in a conveniently grippable position.

Near the front of the frame is a wiper support 26 on which is a felt wiper 27. The felt wiper is positioned so that the paddle slides under the wiper and the left of the wiper contacts the top of the capsules so that if a drop of sealing liquid still remains it will be wiped off and absorbed by the felt wiper.

For the small size of capsules, the outer cap is of such length that the joint appears at the center of the capsule. For capsules in which the outer cap is off from the center line, the end of the liquid transfer tubes may be elongated so that the seal line comes in contact with the sealing liquid no matter which way the capsule falls in the cavities in the capsule paddle.

*Example 1*

A paddle containing three rows of five cavities, each large enough to contain a No. 0 capsule, is dipped in a barrel containing capsules filled with tetracycline hydrochloride, and checked. The paddle is inspected and found to contain one capsule in each cavity, simultaneously counting the capsules. Any capsules which appear defective on inspection are replaced. The paddle is shoved into the above-described machine, and the liquid transfer tubes containing a drop of sealant liquid are placed in juxtaposition to the capsule seal lines. A solution of 74% water by weight, 25% isopropyl alcohol and 1% of the sodium salt of di(2-ethyl-hexyl)sulfosuccinate is used. The transfer tubes are No. 18 gage hypodermic needle tubing. A small drop of liquid is transferred, which is quickly drawn by capillarity beneath the outer cap. The paddle is withdrawn under a felt wiper which removes any traces of liquid on the outside of the capsule. The capsules are then dumped into a final container, which container is sealed with cotton and a stopper for shipment. The amount of residual moisture from the sealing liquid is in no way deleterious.

*Example 2*

A paddle containing six rows of six capsules each, is placed in juxtaposition to a transfer head having thirty-six corresponding liquid transfer tubes, each of which consists of a small piece of felt in the end of a piece of tubing having an outside diameter of about 3/32 inch. The felts are dipped into the sealing liquid trough containing 10% by weight of ethanol in water having 1/2 of 1% of sodium di(2-ethyl-hexyl)sulfosuccinate. The capsules are No. 3–0 containing phenobarbitol. The liquid rapidly is drawn into the gap between the inner body and the outer cap, the paddle is drawn beneath the felt wiper, and the capsules are inspected and dumped into a funnel leading to the final container which is then capped for shipment. Warm (100° F.) dry air is blown into the container for a few minutes before closing.

*Example 3*

The procedure of Example 1 is repeated using as a sealing fluid a 35% solution of isopropanol containing 1/4 of 1% of di(2-ethyl-hexyl)sulfosuccinate.

Additional capsules are sealed containing a wide variety of pharmaceutical agents with aqueous solutions containing from 10% to 80% by weight of methyl, ethyl, propyl, or isopropyl alcohol, and mixtures of these alcohols. In each instance from about 0.05% to 1% of a non-toxic wetting agent, preferably a sodium salt of di(2-ethyl-hexyl)sulfosuccinate is used.

Additional capsules containing dyes are sealed using nonionic, anionic and cationic wetting agents. In each instance, the liquid flows rapidly and adequately between the inner bodies and the outer cap to give an effective seal. With dyes, including optical bleaches, the entire capsule is dissolved, which permits the use of premeasured quantities, without the user getting the coloring matter on his hands, and of course the toxicity of the solvent or wetting agent is of negligible importance, as compared with pharmaceutical capsules.

Warmed dry air is useful in sealing and drying the capsules more rapidly, particularly with moisture sensitive products.

We claim:

1. The process of sealing ingestible hard shell gelatin capsules comprising an inner body and an overlapping outer cap portion comprising: contacting a small quantity of a solution of from 10% to 80% by weight of a lower aliphatic alcohol selected from the group consisting of methanol, ethanol, propanol, isopropanol and mixtures thereof and from about 0.05% to 1% of a non-toxic surface-active agent in water at the junction of the inner body and overlapping cap, drawing said solution by capillarity between said body and cap, simultaneously visually inspecting and counting the capsules, transferring to a final package, drying in the package, and closing the package.

2. The process of claim 1 in which the surface-active agent is sodium di(2-ethyl-hexyl)sulfosuccinate.

References Cited in the file of this patent

UNITED STATES PATENTS

| | | |
|---|---|---|
| 2,447,462 | Harsh et al. | Aug. 17, 1948 |
| 2,652,343 | Payne | Sept. 15, 1953 |
| 2,732,987 | Moore | Jan. 31, 1956 |
| 2,924,920 | Margolis | Feb. 16, 1960 |
| 2,936,493 | Scherer | May 17, 1960 |